United States Patent
Elzur

(10) Patent No.: US 8,285,881 B2
(45) Date of Patent: Oct. 9, 2012

(54) SYSTEM AND METHOD FOR LOAD BALANCING AND FAIL OVER

(75) Inventor: Uri Elzur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 1628 days.

(21) Appl. No.: 10/938,156

(22) Filed: Sep. 10, 2004

(65) Prior Publication Data

US 2005/0080923 A1 Apr. 14, 2005

Related U.S. Application Data

(60) Provisional application No. 60/501,794, filed on Sep. 10, 2003, provisional application No. 60/507,638, filed on Oct. 1, 2003.

(51) Int. Cl.
G06F 15/16 (2006.01)

(52) U.S. Cl. ......................................................... 709/250

(58) Field of Classification Search ................... 709/250
See application file for complete search history.

(56) References Cited

U.S. PATENT DOCUMENTS

| | | | |
|---|---|---|---|
| 5,444,692 A * | 8/1995 | Basso et al. ................... 370/222 |
| 5,978,951 A * | 11/1999 | Lawler et al. ................. 714/758 |
| 6,047,323 A * | 4/2000 | Krause .......................... 709/227 |
| 6,049,528 A * | 4/2000 | Hendel et al. ................. 370/235 |
| 6,105,151 A | 8/2000 | Mahalingam et al. |
| 6,151,297 A * | 11/2000 | Congdon et al. ............. 370/216 |
| 6,229,538 B1 * | 5/2001 | McIntyre et al. ............. 715/734 |
| 6,247,060 B1 * | 6/2001 | Boucher et al. .............. 709/238 |
| 6,272,113 B1 * | 8/2001 | McIntyre et al. ............. 370/248 |
| 6,314,525 B1 * | 11/2001 | Mahalingham et al. ......... 714/4 |
| 6,381,218 B1 * | 4/2002 | McIntyre et al. ............. 370/245 |
| 6,397,260 B1 * | 5/2002 | Wils et al. ..................... 709/238 |
| 6,400,730 B1 | 6/2002 | Latif et al. |
| 6,460,088 B1 * | 10/2002 | Merchant ...................... 709/236 |
| 6,490,632 B1 * | 12/2002 | Vepa et al. .................... 709/250 |
| 6,512,774 B1 * | 1/2003 | Vepa et al. .................... 370/401 |
| 6,560,630 B1 * | 5/2003 | Vepa et al. .................... 718/105 |
| 6,567,377 B1 * | 5/2003 | Vepa et al. .................... 370/230 |
| 6,590,861 B1 * | 7/2003 | Vepa et al. .................... 370/216 |
| 6,591,303 B1 * | 7/2003 | Hendel et al. ................ 709/238 |

(Continued)

FOREIGN PATENT DOCUMENTS

EP 0 891 061 1/1999

(Continued)

OTHER PUBLICATIONS

Webopedia, Server Blade, Aug. 5, 2002, Webopedia, p. 1.*

(Continued)

*Primary Examiner* — Jerry Dennison
(74) *Attorney, Agent, or Firm* — Thomas, Kayden, Horstemeyer & Risley, LLP

(57) ABSTRACT

Systems and methods for load balancing and/or fail over are provided. In one embodiment, a server system may include, for example, one or more of the following: a first network interface card (NIC); a second NIC having same layer-3 (L3) address as the first NIC; a first network switch coupled to the first NIC, the first network switch receiving an incoming traffic flow destined for the second NIC; and a second network switch coupled to the second NIC and coupled to the first network switch. The first network switch may determine, for example, whether the incoming traffic flow is destined for the first NIC or is destined for the second network switch.

38 Claims, 8 Drawing Sheets

U.S. PATENT DOCUMENTS

| | | | |
|---|---|---|---|
| 6,636,503 B1 | 10/2003 | Shiran et al. | |
| 6,687,758 B2* | 2/2004 | Craft et al. | 709/250 |
| 6,701,463 B1* | 3/2004 | Toeller | 714/47 |
| 6,704,798 B1 | 3/2004 | Mogul | |
| 6,741,566 B1 | 5/2004 | Furlong et al. | |
| 6,763,479 B1* | 7/2004 | Hebert | 714/4 |
| 6,801,527 B1* | 10/2004 | O'Keeffe et al. | 370/386 |
| 6,804,233 B1* | 10/2004 | Congdon et al. | 370/389 |
| 6,807,179 B1* | 10/2004 | Kanuri et al. | 370/395.31 |
| 6,826,456 B1* | 11/2004 | Irving et al. | 700/299 |
| 6,938,092 B2* | 8/2005 | Burns | 709/230 |
| 6,983,303 B2 | 1/2006 | Pellegrino et al. | |
| 7,032,037 B2 | 4/2006 | Garnett et al. | |
| 7,035,955 B2* | 4/2006 | Bobbitt et al. | 710/305 |
| 7,082,527 B2* | 7/2006 | Zimmer et al. | 713/2 |
| 7,089,293 B2* | 8/2006 | Grosner et al. | 709/217 |
| 7,113,487 B1 | 9/2006 | Johnson et al. | |
| 7,152,160 B2 | 12/2006 | Lantto et al. | |
| 7,181,531 B2* | 2/2007 | Pinkerton et al. | 709/238 |
| 7,197,588 B2* | 3/2007 | Tsao et al. | 710/268 |
| 7,213,077 B2 | 5/2007 | Border | |
| 7,233,984 B2* | 6/2007 | Mohamed et al. | 709/220 |
| 7,302,593 B2* | 11/2007 | Rothman et al. | 713/300 |
| 7,313,614 B2* | 12/2007 | Considine et al. | 709/223 |
| 7,327,748 B2* | 2/2008 | Montalvo et al. | 370/412 |
| 7,343,527 B2* | 3/2008 | Makhervaks et al. | 714/49 |
| 7,346,701 B2* | 3/2008 | Elzur et al. | 709/232 |
| 7,346,702 B2* | 3/2008 | Haviv | 709/238 |
| 7,373,500 B2* | 5/2008 | Ramelson et al. | 713/150 |
| 7,389,462 B1* | 6/2008 | Wang et al. | 714/748 |
| 7,411,973 B2* | 8/2008 | McDaniel et al. | 370/463 |
| 7,426,579 B2* | 9/2008 | McDaniel | 709/250 |
| 7,475,167 B2* | 1/2009 | Wunderlich et al. | 710/33 |
| 7,502,884 B1* | 3/2009 | Shah et al. | 710/316 |
| 7,506,074 B2* | 3/2009 | Venkatanarayan et al. | 709/250 |
| 7,512,663 B1* | 3/2009 | Kodama et al. | 709/212 |
| 7,545,741 B1* | 6/2009 | Manickavasagam et al. | 370/230 |
| 7,580,415 B2* | 8/2009 | Hudson et al. | 370/395.6 |
| 7,600,222 B2 | 10/2009 | Wilt et al. | |
| 7,620,057 B1* | 11/2009 | Aloni et al. | 370/395.7 |
| 7,627,693 B2* | 12/2009 | Pandya | 709/250 |
| 7,688,838 B1* | 3/2010 | Aloni et al. | 370/412 |
| 2002/0024964 A1* | 2/2002 | Baum et al. | 370/419 |
| 2002/0059425 A1 | 5/2002 | Belfiore et al. | |
| 2002/0059451 A1* | 5/2002 | Haviv | 709/238 |
| 2002/0073232 A1* | 6/2002 | Hong et al. | 709/238 |
| 2002/0112076 A1* | 8/2002 | Rueda et al. | 709/245 |
| 2002/0147822 A1* | 10/2002 | Susai et al. | 709/229 |
| 2003/0005279 A1 | 1/2003 | Valenci et al. | |
| 2003/0051057 A1 | 3/2003 | Garnett et al. | |
| 2003/0140124 A1* | 7/2003 | Burns | 709/220 |
| 2003/0158906 A1* | 8/2003 | Hayes | 709/211 |
| 2003/0179707 A1* | 9/2003 | Bare | 370/235 |
| 2003/0217183 A1 | 11/2003 | Rimmer et al. | |
| 2004/0010612 A1* | 1/2004 | Pandya | 709/230 |
| 2004/0024833 A1 | 2/2004 | Siddabathuni | |
| 2004/0049580 A1* | 3/2004 | Boyd et al. | 709/226 |
| 2004/0093389 A1* | 5/2004 | Mohamed et al. | 709/212 |
| 2004/0093411 A1* | 5/2004 | Elzur et al. | 709/224 |
| 2004/0133634 A1* | 7/2004 | Luke et al. | 709/203 |
| 2004/0199698 A1* | 10/2004 | Bolian et al. | 710/305 |
| 2004/0257998 A1* | 12/2004 | Chu et al. | 370/252 |
| 2004/0268358 A1* | 12/2004 | Darling et al. | 718/105 |
| 2005/0038878 A1* | 2/2005 | McGee et al. | 709/220 |
| 2005/0055435 A1* | 3/2005 | Gbadegesin et al. | 709/224 |
| 2005/0060427 A1* | 3/2005 | Phillips et al. | 709/238 |
| 2005/0080923 A1* | 4/2005 | Elzur | 709/238 |
| 2005/0120141 A1 | 6/2005 | Zur et al. | |
| 2006/0069792 A1* | 3/2006 | Pinkerton et al. | 709/230 |
| 2006/0233155 A1* | 10/2006 | Srivastava | 370/351 |
| 2006/0248191 A1* | 11/2006 | Hudson et al. | 709/226 |
| 2006/0251085 A1* | 11/2006 | Kalkunte et al. | 370/400 |
| 2007/0064724 A1* | 3/2007 | Minami et al. | 370/463 |
| 2007/0083638 A1* | 4/2007 | Pinkerton et al. | 709/224 |
| 2007/0147238 A1* | 6/2007 | Kadambi et al. | 370/229 |
| 2008/0095182 A1* | 4/2008 | Elzur et al. | 370/412 |
| 2008/0151922 A1* | 6/2008 | Elzur et al. | 370/412 |
| 2009/0063696 A1* | 3/2009 | Wang et al. | 709/232 |

FOREIGN PATENT DOCUMENTS

| | | |
|---|---|---|
| EP | 1206099 | 5/2002 |
| WO | 03/021436 | 3/2003 |
| WO | 2005/057880 | 6/2005 |

OTHER PUBLICATIONS

Mike Ko, Technical Overview of iSCSI Extensions for RDMA (iSER) & Datamover Architecture for iSCSI (DA),Mike Ko, Jul. 21, 2003 pp. 1-35.*

Mike Ko et al., ISCSI Extensions for RDMA Specification Jul. 2003, Version 1.0, pp. 1-76.*

European Search Report corresponding to European Patent Application No. 04023595.4-1249, dated Mar. 3, 2010.

International Search Report for PCT/International Application No. PCT/US2004/041100, mailed Feb. 24, 2006, 6 pages.

International Preliminary Report on Patentability corresponding to International Application Serial No. PCT/US2004/041100, mailed Jul. 17, 2008, 9 pages.

Clark T, IP SANs, A Guide to iSCSI, iFCP and FCIP Protocols for Storage Area Networks, »2002, Pearson Education, USA, XP002356300, Ch. 3 and CH. 8.

* cited by examiner

SYSTEM AND METHOD FOR LOAD BALANCING AND FAIL OVER

CROSS REFERENCE TO RELATED APPLICATIONS

This application makes reference to, claims priority to and claims benefit from U.S. Provisional Patent Application Ser. No. 60/501,794, entitled "System and Method for Load Balancing and Fail Over" and filed on Sep. 10, 2003; and U.S. Provisional Patent Application Ser. No. 60/507,638, entitled "System and Method for Load Balancing and Fail Over" and filed on Oct. 1, 2003.

INCORPORATION BY REFERENCE

The above-referenced United States patent applications are hereby incorporated herein by reference in their entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Conventional server systems are limited in types of load balancing and may be susceptible to a single point of failure. For example, a convention server system may have one or more network interface cards (NICs) communicating via single network switch. If the single network switch should fail or if the connections to or from the single network switch should fail, then the entire server system may be unable to communicate with systems on the other side of the single network switch.

Furthermore, although conventional server systems may provide limited load balancing, such server systems are limited to layer-2 (L2) load balancing and are limited to a peer-to-peer pair (i.e., multiple flows between a peer-to-peer pair must be on the same path). Thus, the conventional server systems have only L2 load balancing on a per client granularity.

Further limitations and disadvantages of conventional and traditional approaches will become apparent to one of ordinary skill in the art through comparison of such systems with one or more aspects of the present invention as set forth in the remainder of the present application with reference to the drawings.

BRIEF SUMMARY OF THE INVENTION

Aspects of the present invention may be found in, for example, systems and methods that provide load balancing and/or fail over.

In one embodiment according to some aspects of the present invention, a server system may include, for example, one or more of the following: a first network interface card (NIC); a second NIC having same layer 3 (L3) address as the first NIC; a first network switch coupled to the first NIC, the first network switch receiving an incoming traffic flow destined for the second NIC; and a second network switch coupled to the second NIC and coupled to the first network switch. The first network switch may determine, for example, whether the incoming traffic flow is destined for the first NIC or is destined for the second network switch. In other embodiments according to some aspects of the present invention, the first NIC and the second NIC may have different L3 addresses.

In another embodiment according to some aspects of the present invention, a blade server may include, for example, a server blade, a first network switch and a second network switch. The server blade may include, for example, a first NIC and a second NIC. The first NIC and the second NIC may have an identical media access control (MAC) address and an identical Internet protocol (IP) address. The first network switch may be coupled to the first NIC and may receive traffic flows of different flow types. The second network switch may be coupled to the second NIC and may be coupled to the first network switch. The first network switch may determine whether a particular traffic flow is destined for the first NIC or is destined for the second NIC. In some embodiments according to some aspects of the present invention, other types of servers may be used instead of or in addition to a blade server. In other embodiments according to some aspects of the present invention, the first NIC and the second NIC may have different MAC addresses and/or different IP addresses.

In yet another embodiment according to some aspects of the present invention, a method that provides load balancing in a server system may include, for example, one or more of the following: receiving traffic flows at a first network switch; performing a hash on a particular flow of the received traffic flows; and determining whether to send the particular flow to a first NIC or a second NIC based on, at least in part, the performed hash, the first NIC and the second NIC having the same layer-2 address and the same layer-3 address.

These and other features and advantages of the present invention may be appreciated from a review of the following detailed description of the present invention, along with the accompanying figures in which like reference numerals refer to like parts throughout.

DETAILED DESCRIPTION OF THE INVENTION

Figure 1:
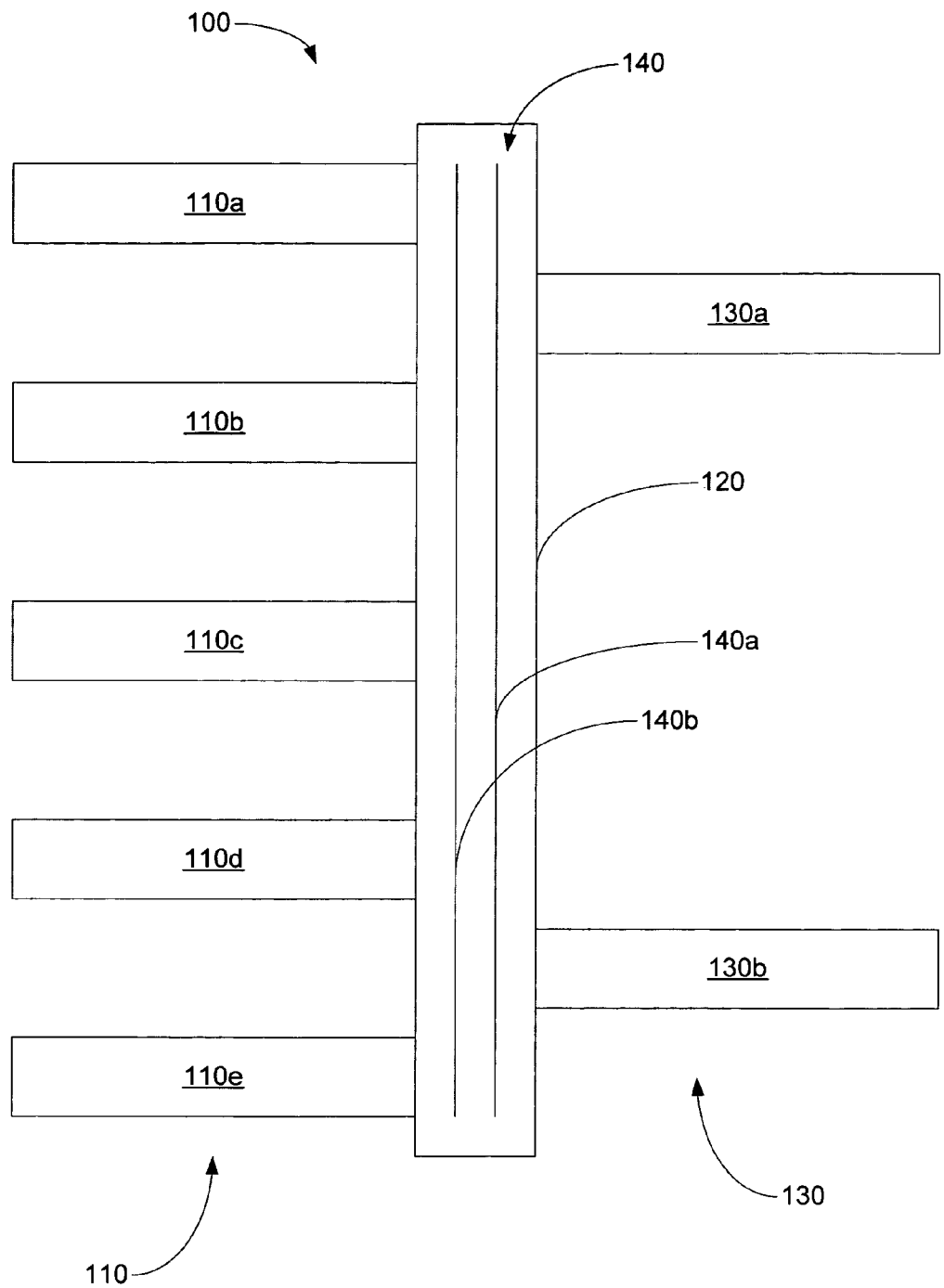
FIG. 1 shows a block diagram illustrating a blade server according to an embodiment of the present invention.

Various embodiments according to some aspects of the present invention may relate to, for example, systems and methods that provide load balancing and/or fail over. Some embodiments according to some aspects of the present invention may provide for layer-4 (L4) or higher-layer (e.g., up to layer 7 (L7)) load balancing and/or fail over. Some embodiments according to some aspects of the present invention may provide for layer-4/layer-5 (L4/L5) load balancing and/or fail over.

Various embodiments according to some aspects of the present invention may provide for offloading storage, cluster and/or transport/network communications. Some embodiments according to some aspects of the present invention may provide for transmission control protocol/Internet protocol (TCP/IP) offloading via a TCP/IP offload engine (TOE). Some embodiments according to some aspects of the present invention may provide for Internet small computer system interface (iSCSI) offloading. Some embodiments according to some aspects of the present invention may provide for remote direct memory access (RDMA) offloading. Some embodiments according to some aspects of the present invention may provide for iSCSI-extensions-for-RDMA (iSER) offloading. Some embodiments may provide for network file system (NFS) offloading. Some embodiments according to some aspects of the present invention may provide for L4 or higher load balancing and/or fail over the different types of flows.

Some embodiments according to some aspects of the present invention may be used in multiple high-speed networks such as, for example, 1 Gb/s or 2.5 Gb/s or 10 Gb/s links (e.g., Ethernet links).

Some embodiments according to some aspects of the present invention may provide load balancing that is substantially matched, for example, to one or more of the following: processing power available on a host; bandwidth of one or more network interface cards (NICs); and bandwidth of the one or more switches.

Other embodiments according to some aspects of the present invention may provide dynamic assignment of flows on a particular server in order that an optimal choice of a central processing unit (CPU) is used with an optimal choice of NICs. The L4/L5 load balancing and/or fail over may be provided for a plurality of different, similar or identical NICs.

Various embodiments according to some aspects of the present invention may eliminate problems relating to a single point of failure.

Some embodiments according to some aspects of the present invention may provide for L2 and L4/L5 load balancing and/or fail over. The L2 and L4/L5 load balancing and/or fail over may even be simultaneous. Some embodiments according to some aspects of the present invention may provide that L2 traffic flow may include, for example, any traffic flow (e.g., TCP/IP traffic flow) that is currently not offloaded to an offload engine at, for example, L4 or higher.

Some embodiments according to some aspects of the present invention may provide for some types of traffic to be excluded, at least in part, from load balancing. For example, special traffic such as network management traffic may be exempt, in some cases, from load balancing. A particular network management traffic flow may be assigned to a preselected NIC, for example. However, the particular network management traffic flow may still be reassigned to another NIC during fail over.

Various embodiments according to some aspects of the present invention may provide a network switch. The network switch may be, for example, mainly in an administratively controlled environment. The network switch may be disposed, for example, in a chassis or cabinet including, for example, server blades. The network switch may provide, for example, quality of service (QoS) in a controlled environment for bandwidth or latency-sensitive flows such as, for example, RDMA applications.

FIG. 1 shows a block diagram illustrating a blade server according to an embodiment of the present invention. The blade server 100 may include, for example, a plurality of server blades 110, a mid-plane 120 and a plurality of network switches 130. The plurality of server blades 110 may be coupled, for example, to the mid-plane 120 which, in turn, may be coupled to the plurality of network switches 130. In some embodiments according to the present invention, the mid-plane 120 may include, for example, a plurality of traces 140. Each network switch 130 may be coupled to a respective trace 140. Each trace 140 may provide a point-to-point link between a switch port and a NIC and may be adapted to support a plurality of different types of traffic flow.

Figure 2:
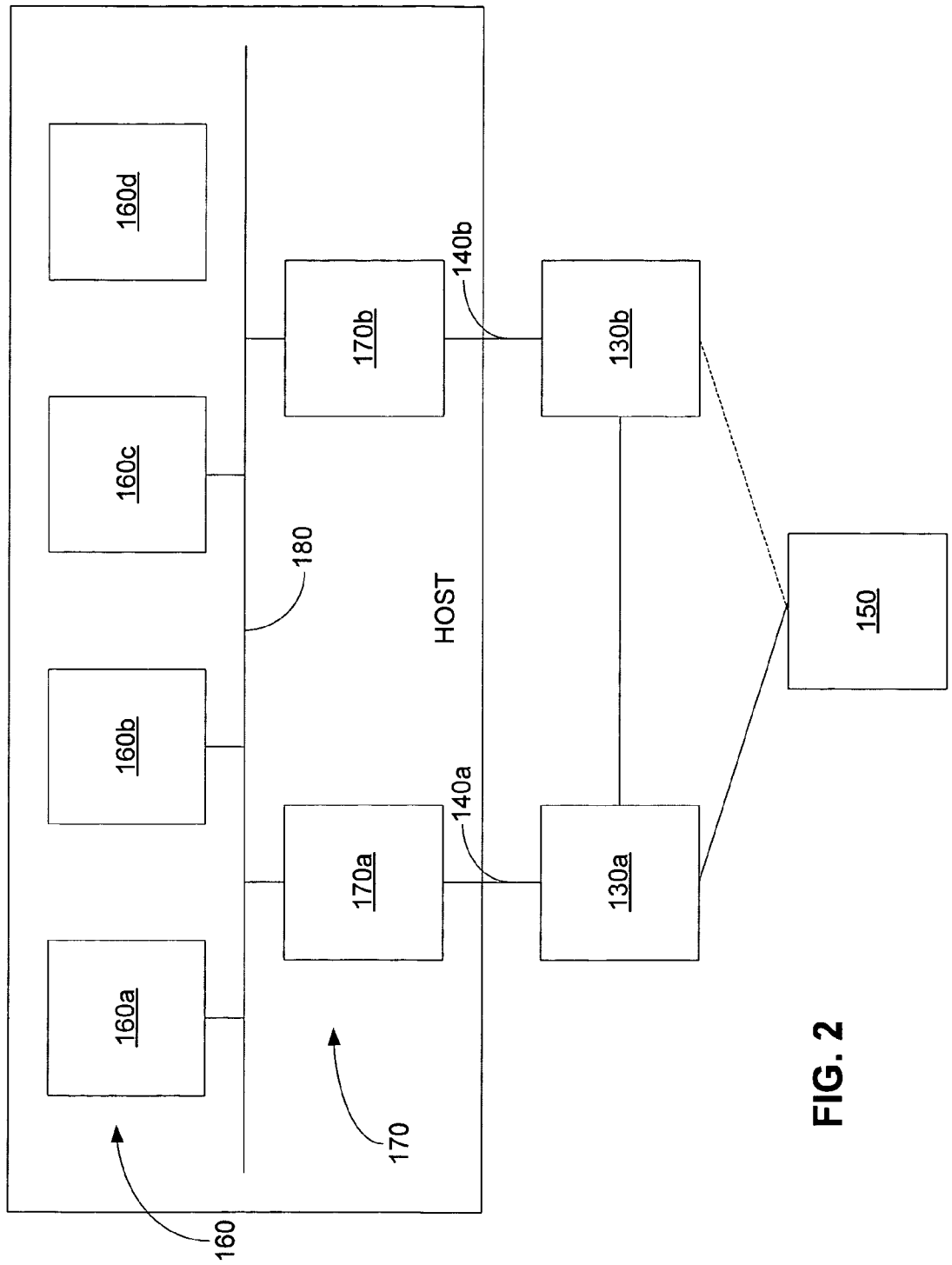
FIG. 2 shows a block diagram illustrating portions of the blade server according to an embodiment of the present invention.

FIG. 2 shows a block diagram illustrating portions of the blade server according to an embodiment of the present invention. Referring to FIG. 2, a host of one of the plurality of server blades 110 may be coupled to the network switch 130a and the network switch 130b. At least one of the two network switches 130a, 130b may be coupled to an extender switch 150 or another network (not shown). The two network switches 130a, 130b may be coupled to each other, for example, via a dedicated link (e.g., a 10 Gb/s link) via dedicated respective local ports. The host may include, for example, a plurality of CPUs 160 and a plurality of NICs 170. The host may also include, for example, one or more of the following: a driver (e.g., a NIC driver), an intermediate (IM) driver and an operating system (OS). The CPUs 160 and the NICs 170 may be coupled, for example, via a link 180 (e.g., a bus). In some embodiments according to the present invention, the server blade 110a may be coupled to the network switch 130a and the network switch 130b, for example, via a trace 140a and a trace 140b, respectively, on the mid-plane 120.

Although illustrated as two network switches 130a, 130b and two NICs 170a, 170b, some embodiments of the present invention contemplate more or less than two network switches or more or less than two NICs. For example, one embodiment according to the present invention may provide for three network switches and three NICs. Also, the number of NICs and network switches may be different.

Furthermore, the links between various components illustrated in FIG. 2 and other figures herein merely show exemplary links. Some embodiments according to the present invention may use different links or different sets of links in coupling various components. For example, although FIG. 2 illustrates a link between extender switch 150 and network switch 130a, some embodiments according to the present invention may use a link between extender switch 150 and network switch 130b instead of or in addition to the link between extender switch 150 and network switch 130a. In addition, some embodiments according to the present invention may prefer to block particular links that may be illustrated in one or more of the figures herein.

The NICs 170a, 170b may be adapted to perform L2 processing on packets before forwarding the packet to one or more of the CPUs 160 for protocol stack processing according to some embodiments of the present invention. The NICs 170a, 170b may be adapted to perform L4/L5 offloading according to some embodiments of the present invention. L4/L5 offloading may include, for example, the processing of packets using some L4 and/or L5 headers and state information. In one example, the NICs 170a, 170b may be adapted to perform offloading of storage, cluster and/or transport/network communications. Some state information relating to the offloaded connections may be stored by the NICs 170a, 170b. The NICs 170a, 170b may be capable of performing offload and/or non-offload processing of packets. The NICs 170a, 170b may comprise, for example, one or more of the following: a network interface card, a network controller and a network adapter.

The host may be configured in accordance with various models according to some embodiments of the present invention. In one embodiment according to the present invention, the host may include the NICs 170a, 170b, each with the same media access control (MAC) address and the same IP address. The multiple NICs 170a, 170b may split TCP port space and the NICS 170a, 170b, which are part of a NIC team, may appear as one NIC, for example, to the extender switch 150 and/or to the host. In another embodiment according to the present invention, the host may include the NICs 170a, 170b, each with a different MAC address, but each with the same IP address. The NICs 170a, 170b, which are part of a NIC team, may still appear as one NIC, for example, to the extender switch 150 and/or to the host. In yet another embodiment according to the present invention, the host may include the NICs 170a, 170b, each with the same MAC address, but each with a different IP address.

In operation, inbound traffic flow may be described with respect to some embodiments of the present invention. A packet from the extender switch 150 may be sent to the network switch 130a in accordance, for example, with a spanning tree protocol. The network switches 130a, 130b may provide trunking between respective ports to the NICs 170a, 170b. Network switch 130a may determine, based on a trunking resolution, to send the packet to the NIC 170a or may determine, based on a trunking resolution, to send the packet to network switch 130b. If sent to the network switch 130b, then network switch 130b may then send packet to NIC 170b. The NIC 170a, 170b that receives the packet from the network switch 130a, 130b may then send the packet to one of the CPUs 160 based on, for example, a CPU selection scheme or take some other action with regard to the received packet.

In some embodiments according to the present invention, inbound traffic flows from multiple sources may be balanced over the NICs 170a, 170b on a flow-by-flow basis which generally provides greater granularity and flexibility than balancing on a source-by-source basis (e.g., a client-by-client basis). In various embodiments according to the present invention, inbound traffic flows may be balanced on a source-by-source basis. In yet other embodiments according to the present invention, inbound traffic flows may be balanced for a particular source on a flow-by-flow basis. In some embodiments according to the present invention, inbound traffic flows may be balanced on a flow-by-flow basis based, in part, on the type of flow (e.g., storage, cluster and network/transport connections).

In operation, outbound traffic flow may be described with respect to some embodiments of the present invention. One of the CPUs 160 may prepare data and send the prepared data to the NIC team (e.g., the NIC 170a and the NIC 170b). The NIC team may appear to the host OS as one NIC according to some embodiments of the present invention. Alternatively, the host OS may be aware of, for example, a trunking algorithm and access the selected NIC directly. Whether the NIC team selects the NIC or the host OS selects the NIC, load balancing and/or failover may be achieved over the NICs 170a, 170b. If the NIC 170a is selected, then the NIC 170a may send a data packet to the network switch 130a. If the NIC 170b is selected, then the NIC 170b may send a data packet to the network switch 130b. The network switch 130b may then forward the data packet via the network switch 130a based, for example, on a MAC address lookup. The network switch 130a may also decide to forward the data packet directly to the extender switch 150.

In some embodiments according to the present invention, outbound traffic flows from the host may be balanced over the NICs 170a, 170b on a flow-by-flow basis which generally provides greater granularity and flexibility than balancing on a destination-by-destination basis (e.g., a client-by-client basis). In various embodiments according to the present invention, outbound traffic flows may be balanced on a destination-by-destination basis. In yet other embodiments according to the present invention, outbound traffic flows may be balanced for a particular destination on a flow-by-flow basis. In some embodiments according to the present invention, outbound traffic flows may be balanced on a flow-by-flow basis based, in part, on the type of traffic flow (e.g., storage, cluster and network/transport connections).

Some embodiments according to the present invention may maintain symmetric paths for inbound and outbound traffic for the same flow. Some embodiments according to the present invention may provide that the same distribution algorithm be used in the NICs, the network switches and possibly the host OS. In some embodiments according to the present invention, if the NICs on the server blade have access to the CPUs, then distribution on the NICs and the network switches may be based on, for example, network load, while distribution on the CPUs may be based on CPU load, which may be different.

Various embodiments according to the present invention may support L2 and/or L4/L5 load balancing with a flow level granularity or resolution. In some embodiments according to the present invention, load balancing may be achieved over all flows supported by a particular host or a particular server blade. Some embodiments according to the present invention may provide, for example, that the host and/or the NICs reassign flows for load balancing. Some embodiments according to the present invention may provide, for example, that the host, the NICs and/or the network switches reassign flows or links for failover or quality of service (QoS) considerations.

Some embodiments according to the present invention may provide fail over including, for example, automatic fail over. For example, in a flow path that includes the extender switch 150, the network switch 130a, the network switch 130b and the NIC 170b, a NIC-network-switch failure may be detected by link parties and/or some management entities. In one example, if link 140b were to fail, then network switch 130b would inform network switch 130a to update its trucking scheme to use the other NIC 170b. The updated information may be passed along to one or more of the following: the NIC 170a, one or more of the CPUs 160, the NIC 170b and some management entities. The NIC 170b may be able to detect a failure in the link 140b and to pass the information to the network switches 130a, 130b via the NIC 170a. The NICs, the network switches and possibly some management entities may exchange, for example, updated topology and/or trunking information which may accelerate convergence to the new scheme. If the NIC 170b were to fail, then the network switch 130b may be able to detect the NIC failure and inform other relevant components (e.g., the network switch 130a, the NIC 170a and/or some management entities) which may then update information so that traffic flows may fail over to the NIC 170a. If the network switch 130b were to fail, then the network switch 130a or the NIC 170a may be able to detect the network switch failure and to inform other relevant components (e.g., the NIC 170a, the NIC 170b, the network switch 170*a* and/or some management entities) which may then update information so that traffic flows may fail over to the NIC 170*a*.

An L4/L5 load balancing and fail over zone (L4-LBFO zone) may include, for example, a subsystem comprising NICs 170 and network switches 130. The CPUs 160 may optionally be considered part of the L4-LBFO zone. In the L4-LBFO zone, NIC/network-switch load balancing may be used for optimizing network traffic. In some embodiments according to the present invention, optimization of NIC resources may use separate load balancing for different types of flows. Some types of flows may include, for example, high resource flows such as RDMA or iSER/iSCSI flows; low resource flows such as TOE flows; and stateless resources (e.g., L2 flows).

In some embodiments according to the present invention, NIC/network switch configuration may be driven by the host. The host, for example, may initiate a configuration update cycle due to, for example, load balancing or fault. A topology update message may be pushed from the host to the NIC 170*a*, 170*b* and to a respective network switch port of the network switch 130*a*, 130*b*. The topology update message may include, for example, one or more of the following: MAC address, IP address, type of L4 protocol and L4 protocol port range or ranges. The network switch 130*a*, 130*b* may, for example, check whether neighbors are configured for L4-LBFO for the same host. The network switch 130*a*, 130*b* may also check, for example, if the NICs 170*a*, 170*b* are using the same MAC address and the same IP address or if the NICs 170*a*, 170*b* are using only the same IP address.

Figure 3:
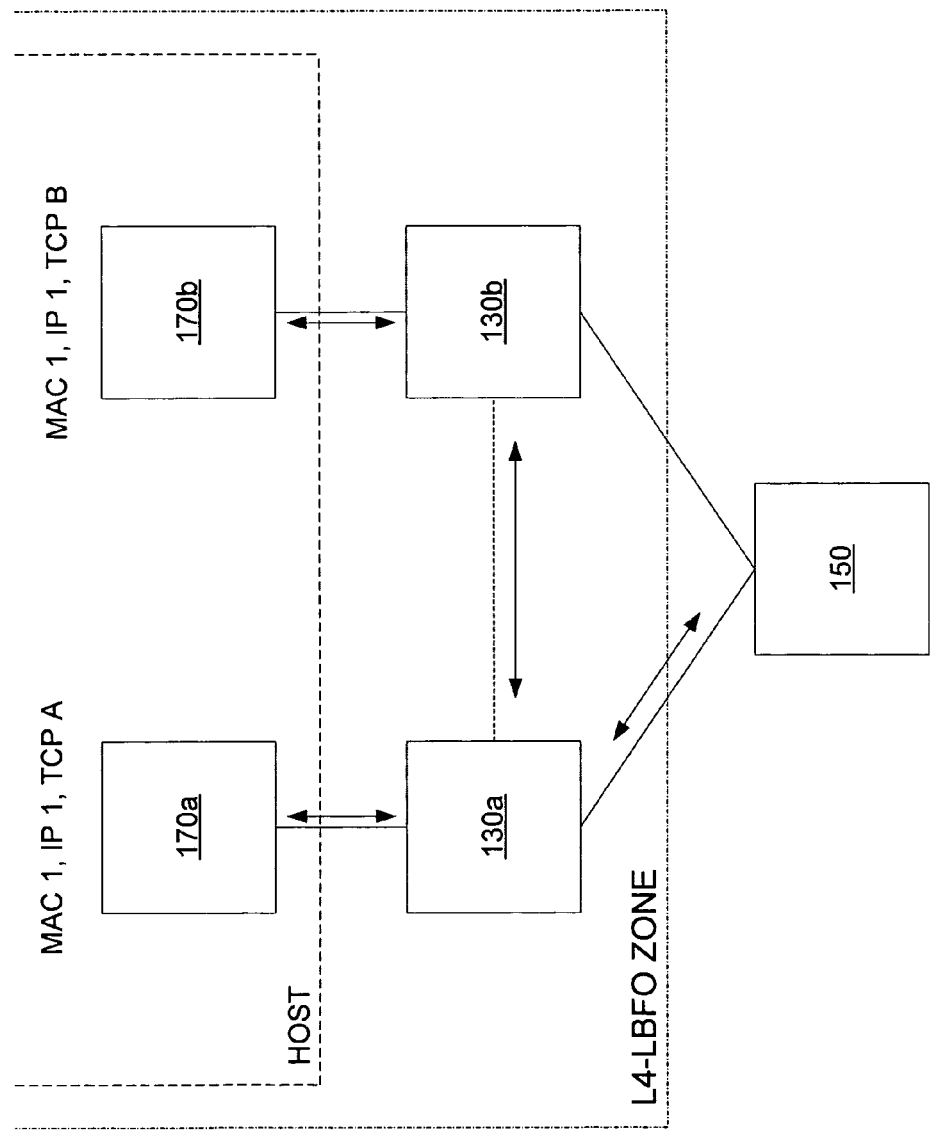
FIG. 3 shows a block diagram illustrating a layer-4/layer-5 load balancing and fail over (L4-LBFO) zone according to an embodiment of the present invention.

In some embodiments according to the present invention, if an L4-LBFO neighbor is found (e.g., a network switch that is part of the L4-LBFO zone for the same host) and if the NICs 170*a*, 170*b* share the same MAC address and IP address as illustrated in FIG. 3, then the L4-LBFO neighbor network switches 170*a*, 170*b* may select one of the network switches to represent the L4-LBFO neighbor network switches. The selected network switch may send out traffic. An L2 destination address (DA) may be seen by the other switches. The network switches 130*a*, 130*b* on the L4-LBFO switch team may forward traffic (e.g., all traffic) from the host NICs 170*a*, 170*b* through the network switch selected to represent the L4-LBFO switch team. Similarly, the network switch selected to represent the L4-LBFO switch team may receive incoming packets from extender switch 150. The selected switch may then lookup the desired local port which may be linked, for example, to a NIC or another network switch. For example, if the network switch 130*a* was the selected switch, then incoming packets may be received by the network switch 130*a* from the extender switch 150. The network switch 130*a* may then determine whether the received packet should be forwarded to the NIC 170*b* supported by a network switch port of the network switch 130*b* or whether the received packet should be forwarded to the NIC 170*a* supported by a local network switch port of the selected network switch 130*a*. After the determination, the packet may then be forwarded from a local port of the selected network switch 130*a*.

In some embodiments according to the present invention, the network switch 130*a* and the network switch 130*b* may split the burden of representing the L4-LBFO zone. For example, roughly half of the servers and their related L3 and L2 addresses may be represented by the network switch 130*a* and roughly the other half of the servers and their related L3 and L2 addresses may be represented by the network switch 130*b*. The spanning tree protocol may be disabled, for example, at least with respect to the network switch 130*a*, the network switch 130*b* and the extender switch 150.

In some embodiments according to the present invention, the L4-LBFO zone may be extended towards the extender switch 150 to prevent the case in which all the traffic flows are sent to one network switch representing the network switch team. Topology information, a trunking algorithm and/or a hash algorithm, for example, may be sent to the extender switch 150 to facilitate in extending the LB-LBFO zone. The extender switch 150 may also employ a different hash thereby guaranteeing consistent distribution of traffic flow based on, for example, flow or random distribution. The spanning tree protocol may be disabled so that the network switch 130*a* and the network switch 130*b* may be connected to the network extender 150. However, if some L2/L3 address pairs are accessible through one network switch (e.g., network switch 130*a*) and other pairs are accessible through the other network switch (e.g., network switch 130*b*), then both network switches may be part of the spanning tree and no special configuration may be needed on the extender switch 150, which may outside the L4-LBFO zone. In another example, the path between the peers may be fully redundant and there may be no switch, such as the extender switch 150, that is a member of the spanning tree of both network switch 130*a* and network switch 130*b*.

Figure 4:
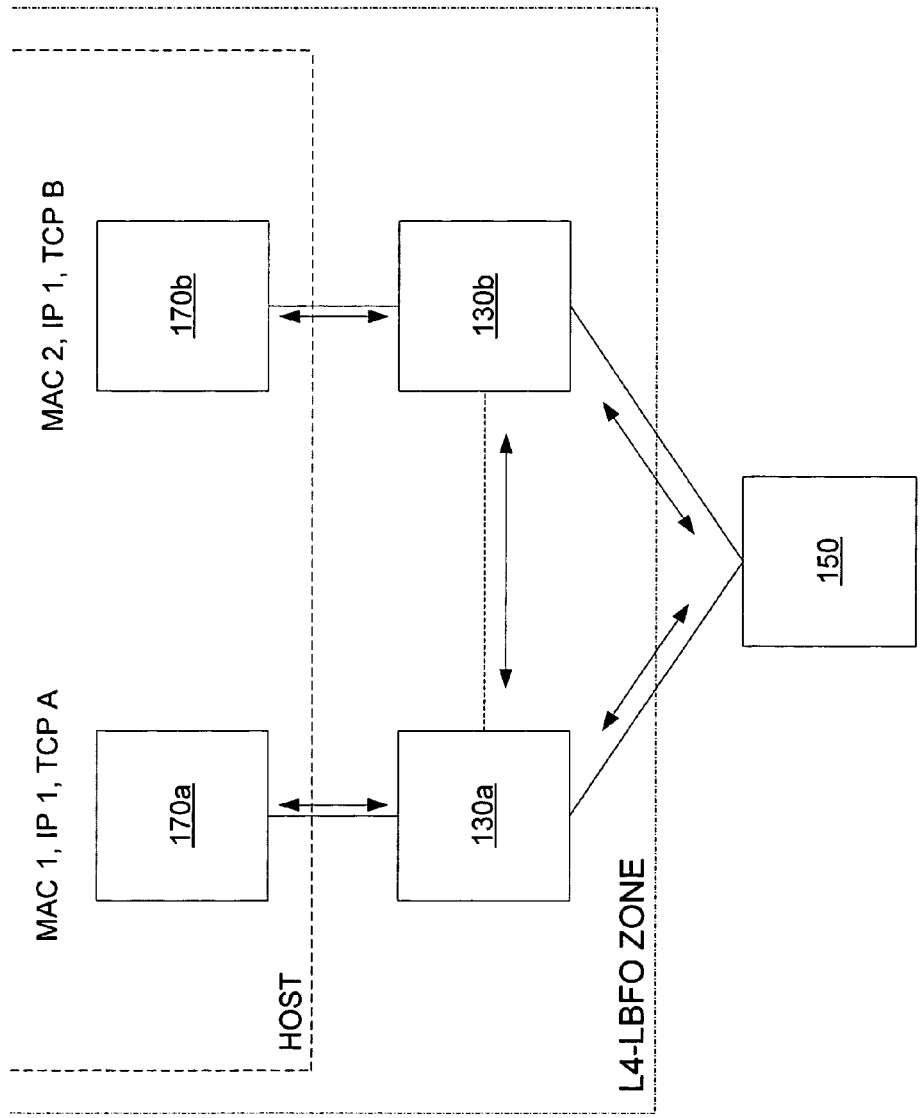
FIG. 4 shows a block diagram illustrating an L4-LBFO zone according to an embodiment of the present invention.

In some embodiments according to the present invention, if an L4-LBFO neighbor is found and if the NICs 170*a*, 170*b* have different MAC addresses but the same IP address as illustrated in FIG. 4, then the L4-LBFO neighbor switches may share information relating to L3 and higher switching. L2 operation might not be impacted. For outbound traffic, forwarding may be based on the L2 DA. For inbound traffic, a network switch of the L4-LBFO zone may receive data from the extender switch 150 based on, for example, the spanning tree topology of the switches. The network switch of the L4-LBFO zone that received the data may then perform a lookup based on, for example, an L2 MAC address. The network switch of the L4-LBFO zone that received the data may then forward the data based on the L2 MAC address. The data may be forwarded, for example, via a local port to a NIC or to another network switch. Since the NICs 170*a*, 170*b* may employ different L2 addresses, but may share the same L3 address, some L2 load balancing schemes may be employed in parallel. In some embodiments of the present invention, not all of the NICs are necessarily capable of L4 or higher layer offloading.

In some embodiments according to the present invention, if the NICs 170*a*, 170*b* have different MAC addresses but the same IP address, then, in some instances, peer-to-peer load balancing (e.g., with client granularity) may be used instead or in addition to flow-by-flow load balancing (e.g., with flow granularity). The switch may mask such balancing from outside the L4-LBFO zone.

Some embodiments according to the present invention may provide that the link between the network switches 130*a*, 130*b* is not necessarily included in a spanning tree. The link between the network switches 130*a*, 130*b* may be used, for example, for data forwarding and/or sharing configuration information.

In some embodiments according to the present invention, fail over may be performed by the host. Load balancing may be limited by the host to per peer load balancing according to some embodiments of the present invention. The QoS for particular flows may include, for example, one or more of the following options: a type of service (TOS) field in an IP packet; a virtual local area network (VLAN); and a host-to-switch configuration.

Figure 5:
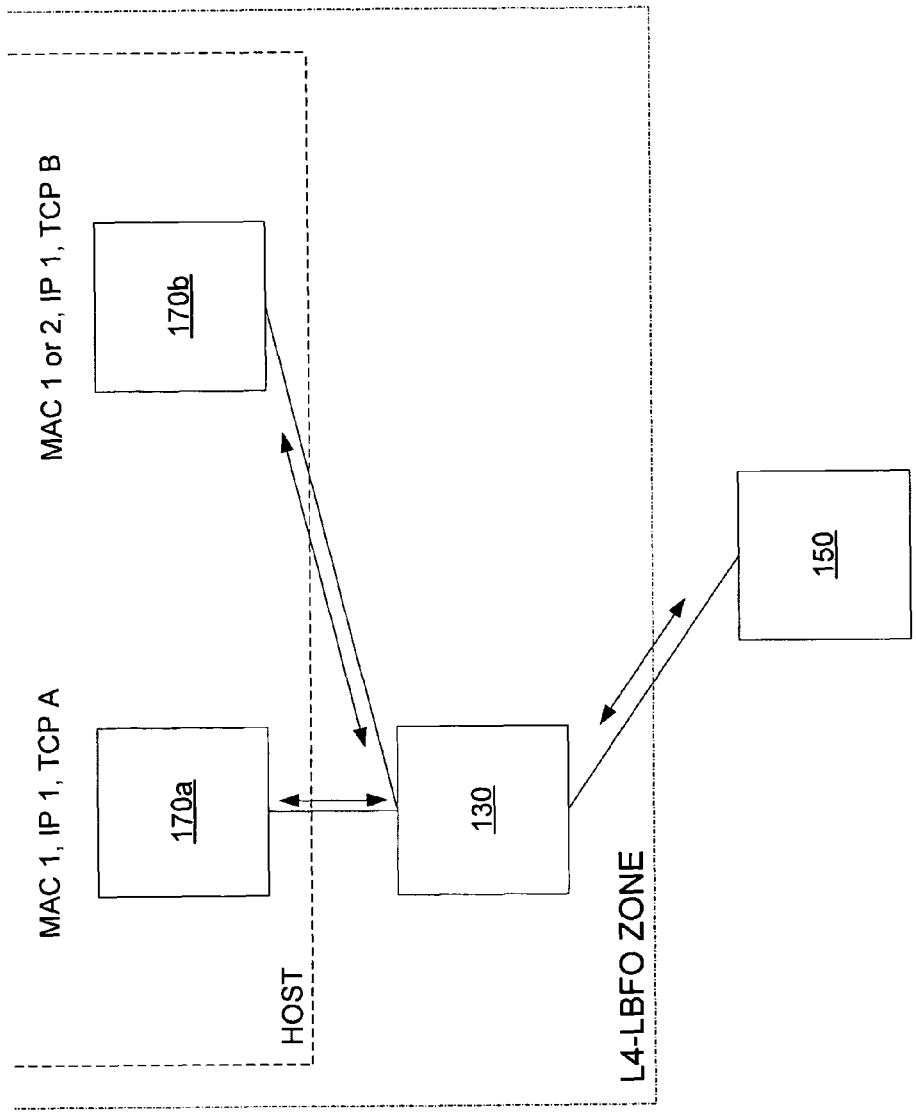
FIG. 5 shows a block diagram illustrating an embodiment of a network-interface-card/network-switch configuration according to some aspects of the present invention.

FIG. 5 shows a block diagram illustrating an embodiment of a NIC/network-switch configuration according to some aspects of the present invention. Trunking may be achieved using a single network switch 130. The NIC/network switch configuration, which may use the same MAC address or different MAC addresses for the NICs 170a, 170b, may operate in a similar manner as the NIC/network-switch configurations, for example, shown in FIGS. 3 and 4.

Updates to the L4-LBFO zone may be host initiated and/or network switch initiated according to some embodiments of the present invention. In the case of host initiated L4-LBFO updates, the host may detect fault or may decide to reassign L4-LBFO zone resources. For example, the host may check the resource availability of the NICs in deciding whether to reassign L4-LBFO zone resources. If a disproportionate amount of resources are available on a particular NIC, the host, with the assistance of the NICs, may move connections (e.g., flows) toward the under-used NIC resources. For example, host outbound traffic may be reassigned to the under-used NIC. During the update transition, the original NIC may drop packets, forward packets to the host or forward packets to the under-used NIC. The host also may update the network switches by sending topology update messages or by sending a new hash pattern. The host may identify the network switch, to which connections have been moved, and may monitor changing information such as, for example, one or more of the following: tuple, new switch assignments, new port assignments, and spanning tree changes. The network switch, from which connections have been moved, may be notified of the transitions, for example, by the network switch, to which connections have been moved. The network switches may use the new hash pattern sent by the host, for example, to infer changes to be made in their tables or to the spanning tree. Some embodiments according to the present invention may provide that, in some cases in which multiple L2 addresses (e.g., MAC addresses) are employed for the same L3 address (e.g., IP address), address resolution protocol (ARP) messages may be sent to notify senders of possibly new MAC addresses.

Network switch initiated L4-LBFO updates may be triggered by an event such as, for example, fault detection according to some embodiments of the present invention. The network switches may support host reassignment and, in the case of uplink failure, may notify the host to enable faster fail over on the host, possibly before the transport may detect the uplink failure via timeouts. Notifying the host may enable the host to maintain the connection through the fail-over process. The network switches may also initiate L4-LBFO updates if some switch resources are over loaded according to some embodiments of the present invention.

Some embodiments of the network switches may provide, for example, one or more of the following features according to the present invention. The network switches may support inter-switch communications and the updating of the spanning tree. The network switches may support high-speed communications (e.g., 10 Gb/s links) between the network switches. The network switches may be adapted to support the same MAC address from at least two ports. The network switches may be adapted to support trunking of at least two ports so that they share the same MAC address. The network switches may be adapted to support, at wire speed, tuple lookup or any other headers or partial headers or combination of headers.

Some embodiments of the network switches according to the present invention may provide, for example, a filter table per IP address pair and per TCP port pair. Via the table on the network switch, thousands of TCP flows may be supported although possibly additional memory resources may be used. The forwarding may be accomplished on a per TCP-flow basis. The switch may use hashing to determine, for example, which of the network switch ports to use. Hashing may also reduce memory resource requirements. The same hashing may be used in the NIC and the network switch so that the same flows may be on the same paths. Such a scheme may provide, for example, support of TOE (or higher layer) offload NIC in which flow state information (e.g., TCP state information) is maintained by a NIC. The hash input may be, for example, one or more of the following parameters: MAC source address (SA), MAC DA, IP source (SRC) address, IP destination (DST) address, TCP SRC port, TCP DST port and additional parameters. The hash output or set of outputs may be distributed over the network switch ports according to a distribution algorithm. For example, has results with LSB=0 may be directed to port x and LSB=1 may be directed to port y. An update to the load balancing or failover may translate into a new distribution and/or a new hash or new hash parameters (e.g., using a different subset of address bits).

Some embodiments of the network switches according to the present invention may associate inbound traffic with a particular group of NIC resources and a particular hash inside the group to support load balancing on the NICs. Each flow may be classified into a particular category such as, for example, one of the following categories: L2 flow for which the NICs do not store state; TCP flow which may be TCP offload flow or not; iSCSI flow; and RDMA flow. The iSCSI flow may use a known port and may follow iSCSI redirection. The redirected traffic might be dedicatedly identified on a per flow basis. An iSCSI target list may be used and load balancing may be achieved within the iSCSI group. The network switches may use a separate hash for the iSCSI group. The RMDA flow may use a port mapper as used in Winsock Direct (WSD) and with Sockets Direct Protocol (SDP) or may use random or arbitrary ports that may be listed in a table. One or more port ranges may be associated with RDMA flows including, for example, iSER flows.

Figure 6:
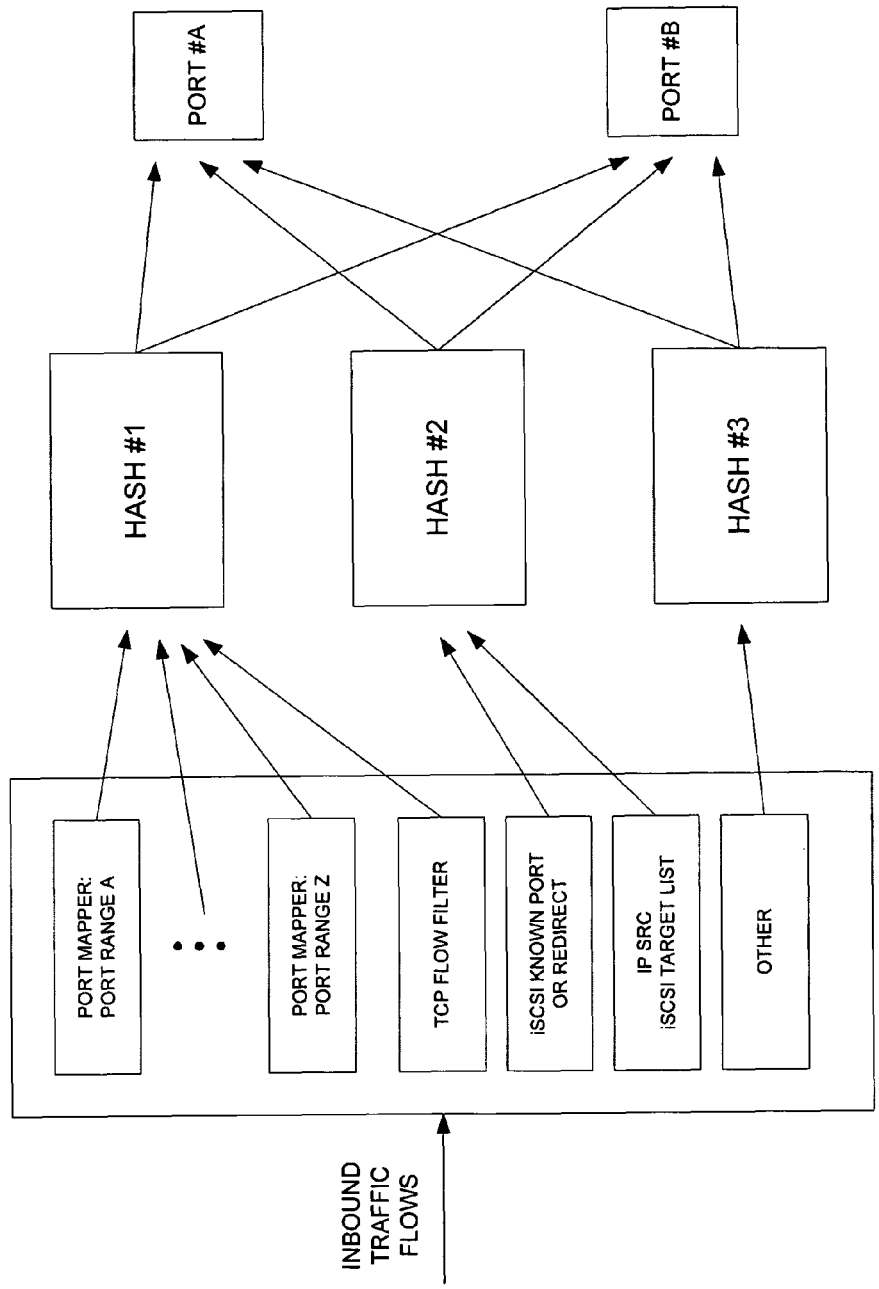
FIG. 6 shows a block diagram illustrating an embodiment of a portion of a network switch according to the present invention.

FIG. 6 shows a block diagram illustrating an embodiment of a portion of a network switch according to the present invention. Incoming traffic flow ranges are received directly or indirectly from a port mapper and sent to a network switch. In one example, the incoming traffic may have the same L2 MAC DA and IP DA, but different TCP ports although the embodiment need not be so limited. The port mapper, which may be resident on the host, may be used to assign port ranges to a specific type of flow traffic (e.g., L2 flow, TCP flow, storage flow, cluster flow, etc.). The switch may use filters based on, for example, port ranges in determining the type of flow traffic and in determining which hash to use for load balancing the particular flow. For example, the switch may be able to identify a plurality of port ranges A to Z, for example, in which the switch then sends the flows falling within those port ranges to Hash #1. The switch may employ a TCP flow filter to send TCP flows (e.g., TCP offload flows or TCP non-offload flows) to Hash #1. The switch may employ an iSCSI filter based on, for example, a known port or redirect, to send iSCSI flows to the Hash #2. The switch may employ a particular filter that filters a particular IP SRC or a particular iSCSI target list to send those traffic flows to Hash #2. The switch may employ an additional filter for flows that cannot be grouped to send those flows to Hash #3. Although illustrated as 3 hashing groups, other numbers of hashing groups may be used. Each hashing group may have its own hash that determines to which port of the network switch, for example, Port #A or Port #B, the particular flows should be sent.

Figure 8:
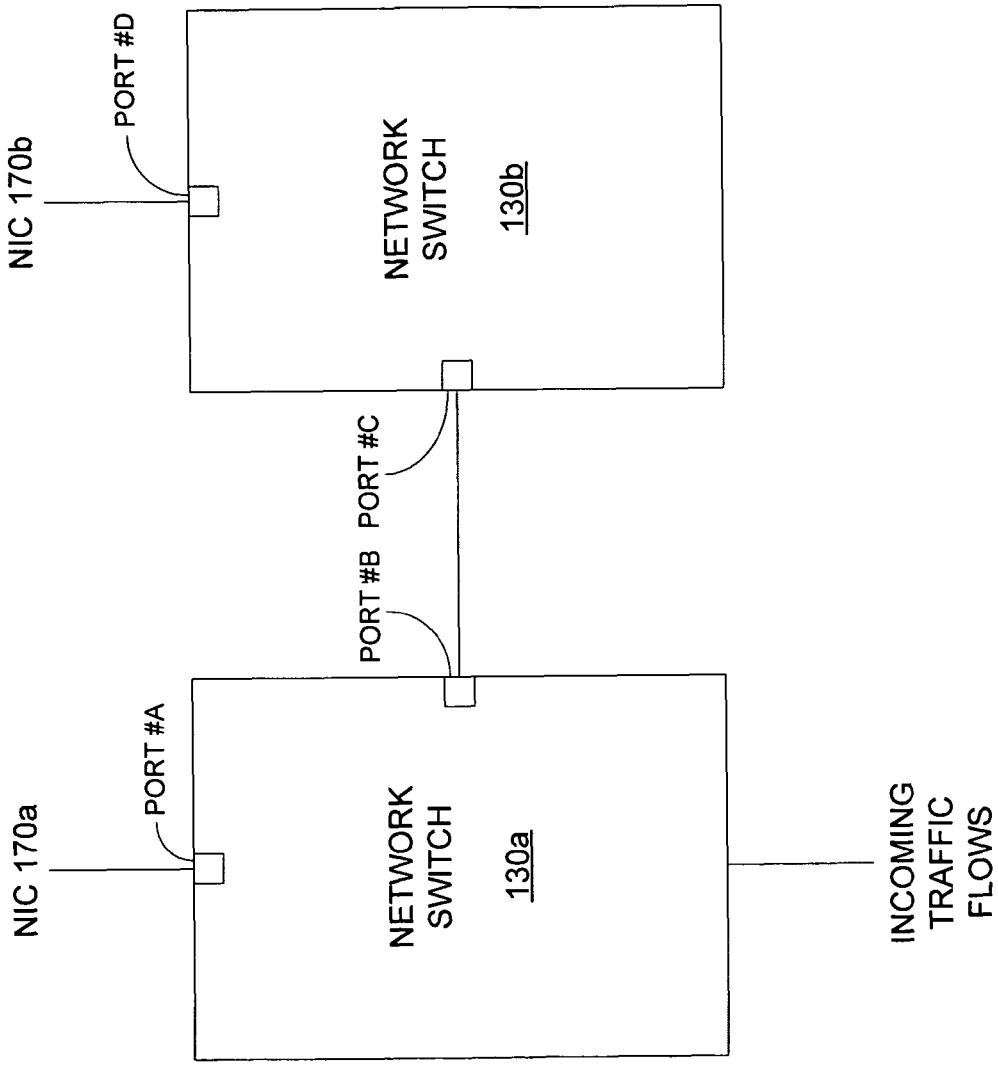
FIG. 8 shows a block diagram illustrating two network switches according to an embodiment of the present invention.

Referring to FIG. 8, incoming traffic flows may be received by the network switch 130a. A hash may be applied to a particular flow to determine whether the particular flow may be sent to Port #A or to Port #B of the network switch 130a. As described above, the hash may be a particular hash that is used for a particular flow type. If the particular flow is destined for the NIC 170a, then the hash result may indicate that the particular flow be sent through Port #A. If the particular flow is destined for the NIC 170b, then the hash result may indicate that the particular flow be sent to the network switch 130b via Port #B. If the particular flow is sent through Port #B, then it may be received at Port #C of the network switch 130b. The network switch 130b then may perform a hash on the particular flow. If the particular flow is destined for the NIC 170b, then the hash result may indicate that the particular flow be sent through Port #D. The above operation may be achieved even if the NICS 170a, 170b have the same MAC address and the same IP address.

Some embodiments of the present invention may provide that each network switch 130a, 130b may have a modified ARP table, for example, if the network switch 130a, 130b is a layer-3 or higher switch, or a forwarding table or a learning table that takes into account a hash result in determining which local port to send the particular flow. The modified ARP tables or forwarding tables may even be shared, at least in part, between the network switches 130a, 130b according to some embodiments of the present invention.

The hashing arrangement illustrated in FIG. 6 may provide, for example, per flow load balancing over flow types (e.g., data types). Since different flow types have different flow characteristics (e.g., different latencies, different bandwidths, etc.), some embodiments according to the present invention may provide for load balancing over different flow types. Furthermore, some embodiments according to the present invention may provide load balancing within particular flow types. Thus, for example, iSCSI flows may be load balanced over the NICs 170a, 170b via Port #A and Port #B such that a portion of the iSCSI flows may be assigned to NIC 170a and the rest of the iSCSI flows may be assigned to NIC 170b. Connections associated with the same iSCSI session may be assigned to plurality of NICs to increase the fault tolerance of the session.

Figure 7:
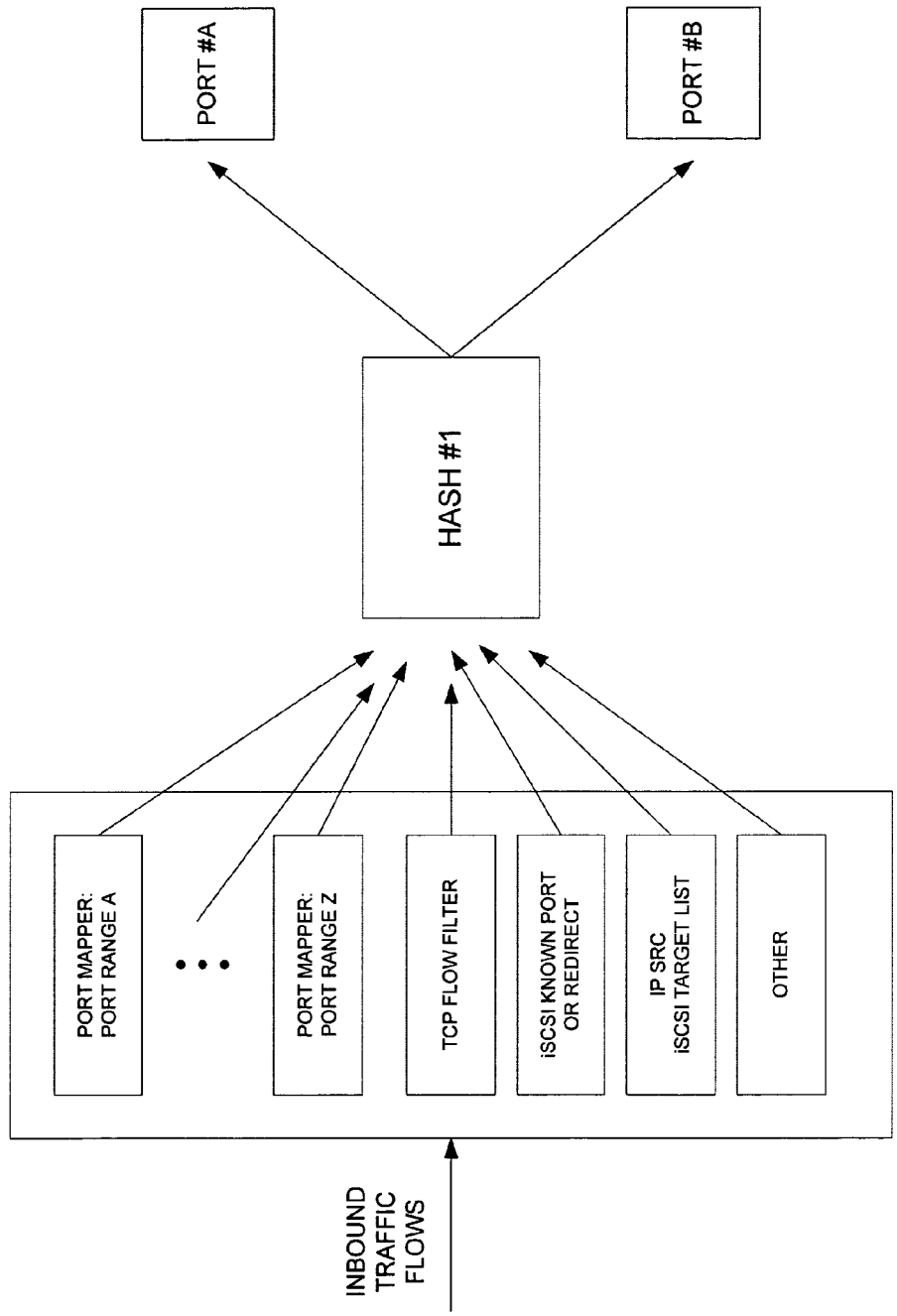
FIG. 7 shows a block diagram illustrating another embodiment of a portion of a network switch according to the present invention.

FIG. 7 shows a block diagram illustrating another embodiment of a portion of a network switch according to the present invention. Referring to FIG. 7, one hashing may be used for the various groupings such as, for example, L2/TOE, storage and RDMA. Some embodiments of the present invention may use fewer hash machines than the number of flow types to be load balanced.

Some embodiments of the host may provide, for example, one or more of the following features according to the present invention. The host may manage resources for multiple traffic flow types, each traffic flow type having different resource requirements from the NICs. Examples of traffic flow types may include, for example, L2, TCP, iSCSI, iSER, RDMA, IPC and others. According to some embodiments of the present invention, the host may attempt, within a particular flow type, to spread flows evenly over the NIC resources. Thus, in some embodiments of the present invention, load balancing may be different for different types of flow. For example, load balancing of offloaded RDMA connections may be different than load balancing of offloaded TCP connections. Resource allocations may be dynamic, although they may be fixed for a particular time duration.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A server system, comprising:
a plurality of processors;
a first network interface card (NIC);
a second NIC having same layer 3 (L3) address as the first NIC, wherein the plurality of processors, the first NIC and the second NIC are part of a host;
a first network switch coupled to the first NIC, the first network switch receiving the incoming traffic flow destined for the second NIC in accordance with a spanning tree protocol, the first network switch sending the incoming traffic flow to the second NIC through a second network switch; and
the second network switch being coupled to the host via the second NIC and being coupled to the first network switch through a dedicated switch-to-switch link, the first network switch being coupled to the host through the first NIC and being coupled to the host through the second network switch and the second NIC, the second network switch being coupled to the host through the second NIC,
wherein the first network switch determines whether the incoming traffic flow is destined for the first NIC or is destined for the second network switch,
wherein the first NIC or the second NIC performs L4 offloading and L5 offloading,
wherein the first NIC or the second NIC performs L4 load balancing and L5 load balancing based on a flow type, the L4 load balancing or the L5 load balancing being substantially matched to processing power of one or more of the processors of the host, a bandwidth of the first NIC or the second NIC, and a bandwidth of the first network switch or the second network switch,
wherein the first NIC, the second NIC, the first network switch and the second network switch are part of an L4-LBFO zone in an administratively controlled environment,
wherein the first NIC or the second NIC is configured to process first packets using some L4 header information and some L4 state information or some L5 header information and some L5 state information,
wherein the first NIC or the second NIC stores some of the L4 state information or some of the L5 state information for offloaded connections,
wherein the first NIC and the second NIC are configurable to split TCP port space and for teaming, and
wherein the server system is operable to provide dynamic assignment of flows in order that an optimal choice of a processor of the plurality of processors is used with an optimal choice of a NIC of the first NIC and the second NIC.

2. The server system according to claim 1, wherein the second NIC has same layer 2 (L2) address as the first NIC.

3. The server system according to claim 1, wherein L2 and L4/L5 load balancing and/or failover occur simultaneously.

4. The server system according to claim 1, wherein the second NIC does not have same L2 address as the first NIC.

5. The server system according to claim 1, wherein the L3 address comprises an Internet protocol (IP) address.

6. The server system according to claim 1, wherein the first NIC or the second NIC can offload layer 7 (L7) connections.

7. The server system according to claim 1, wherein the server system exempts network management traffic from load balancing, assigns the network management traffic to a preselected NIC, and reassigns the network management to another NIC during failover.

8. The server system according to claim 6, wherein the second NIC can offload layer 6 (L6) connections and layer 7 (L7) connections.

9. The server according to claim 1, wherein offloaded L4 or higher connections comprise a transmission control protocol (TCP) offload connection, a remote direct memory access (RDMA) connection and an Internet small computer system interface (iSCSI) connection.

10. The server according to claim 1, wherein the first network switch provides quality of service in a controlled environment for bandwidth- or latency-sensitive flows.

11. The server according to claim 1, wherein offloaded L4 or higher connections comprise iSCSI-extensions-for-RDMA (iSER) connections and network file system (NFS) connections.

12. The server system according to claim 1, wherein incoming traffic flows are balanced for a particular source on a flow-by-flow basis.

13. The server system according to claim 1,
wherein the first network switch performs a hash on at least a portion of the incoming traffic flow, and
wherein a hash result determines whether the incoming traffic flow is sent through a first local port of the first network switch that is coupled to the first NIC.

14. The server system according to claim 13, wherein the hash result determines whether the incoming traffic flow is sent through a second local port of the first network switch that is coupled to the second network switch.

15. The server system according to claim 1,
wherein the second network switch performs a hash on at least a portion of the incoming traffic flow, and
wherein a hash result determines whether the incoming traffic flow is sent through a local port of the second network switch that is coupled to the second NIC.

16. The server system according to claim 1, wherein the first network switch receives a plurality of flows, the plurality of flows being of a plurality of different flow types.

17. The server system according to claim 16, wherein the different flow types comprise a transport type, a cluster type, a file system type and a storage type.

18. The server system according to claim 16, wherein the different flow types comprise at least one of a TCP offload type, an RDMA type and an iSCSI type.

19. The server system according to claim 16,
wherein the first network switch performs a particular hash on at least a portion of a particular flow of the plurality of flows,
wherein the particular hash is part of a plurality of hashes, and
wherein the particular hash is selected as a function of at least the flow type of the particular flow.

20. The server system according to claim 16, wherein the first network switch is adapted to load balance with a per flow granularity.

21. The server system according to claim 16, wherein the first network switch is adapted to load balance within a group of flows of a particular flow type.

22. A blade server, comprising:
a server blade comprising a host that includes a plurality of CPUs, a first network interface card (NIC) and a second NIC, the first NIC and the second NIC provide failover, the first NIC and the second NIC being configurable to perform L4/L5 offload processing and to perform non-offload processing, the first NIC or the second NIC processing first packets using some L4 header information and some L4 state information or some L5 header information and some L5 state information, the first NIC and the second NIC being configurable to split TCP port space and for teaming;
a midplane comprising traces that include a first trace and a second trace;
a first network switch coupled to the first NIC via the first trace of the midplane, the first network switch receiving the traffic flows of different flow types in accordance with a spanning tree protocol; and
a second network switch coupled to the host via the second NIC and the second trace of the midplane, the second network switch being coupled to the first network switch via a dedicated link dedicated to traffic between the first network switch and the second network switch, the first network switch sending incoming traffic flow destined for the second NIC to the second NIC through the second network switch, the first network switch being coupled to the host through the first NIC and being coupled to the host through the second network switch and the second NIC, the first network switch and the second network switch providing failover,
wherein the first network switch determines whether a particular traffic flow is destined for the first NIC or is destined for the second NIC,
wherein load balancing over the first NIC and the second NIC is substantially matched to processing power of one or more of the CPUs of the host, a bandwidth of the first NIC or the second NIC, and a bandwidth of the first network switch or the second network switch,
wherein the first NIC, the second NIC, the first network switch and the second network switch are part of an L4-LBFO zone, and
wherein the blade server is operable to provide dynamic assignment of flows in order that an optimal choice of a processor of the plurality of CPUs is used with an optimal choice of a NIC of the first NIC and the second NIC.

23. The blade server according to claim 22, wherein the first network switch performs a hash on at least a portion of the particular traffic flow to determine the particular traffic flow is destined for the first NIC.

24. The blade server according to claim 22, wherein the first network switch performs load balancing on a per flow basis.

25. The blade server according to claim 22, wherein the first network switch performs load balancing based, at least in part, on a particular flow type.

26. The blade server according to claim 25, wherein the first network switch performs load balancing on a per flow basis within the particular flow type.

27. The blade server according to claim 22, wherein the first network switch and the second network switch employ trunking between respective ports to the first NIC and to the second NIC.

28. The blade server according to claim 22, wherein at least one of the first network switch and the second network switch reassign flows in a fail over operation.

29. The blade server according to claim 22, wherein the first NIC and the second NIC offload layer 5 connections, layer 6 connections and layer 7 connections, wherein the first NIC and the second NIC exempt network management traffic from load balancing.

30. A method for providing load balancing in a server system, comprising:

(a) receiving traffic flows at a first network switch in accordance with a spanning tree protocol;
(b) performing a hash on a particular flow of the received traffic flows;
(c) determining whether to send the particular flow to a first network interface card (NIC) of a host or a second NIC of the host based on, at least in part, the performed hash, the first NIC and the second NIC having the same layer-3 address, the first NIC and the second NIC being configurable to split TCP port space and for teaming, first network switch being coupled to the host through the first NIC and being coupled to the host through a second network switch and the second NIC, the second network switch being coupled to the host through the second NIC, the first NIC sending the received traffic flow destined for the first NIC to the first NIC, the first NIC sending the received traffic flow destined for the second NIC to the second network switch over a dedicated switch-to-switch link and then from the second network switch to the second NIC, wherein the dedicated switch-to-switch link is dedicated to traffic between the first network switch and the second network switch, wherein the first NIC, the second NIC, the first network switch and the second network switch are part of an L4-LBFO zone, wherein the server system is operable to provide dynamic assignment of flows in order that an optimal choice of a processor of the plurality of processors of the host is used with an optimal choice of a NIC of the first NIC and the second NIC;
(d) performing L4 load balancing using the first NIC or the second NIC;
(e) performing L5 load balancing using the first NIC or the second NIC, wherein the load balancing of (d) or (e) is based, at least in part, on a flow type, wherein the L4 load balancing or the L5 load balancing is substantially matched to processing power of one or more of the processors of the host, a bandwidth of the first NIC or the second NIC, and a bandwidth of the first network switch or the second network switch;
(f) performing L4 offloading using the first NIC or the second NIC;
(g) performing L5 offloading using the first NIC or the second NIC;
(h) performing failover between the first NIC and the second NIC; and
(i) performing failover between the first network switch and a second network switch over the dedicated switch-to-switch link.

31. The method according to claim 30, wherein (c) comprises determining whether to send the particular flow to a first port of the first network switch or to a second port of the first network switch, the first port being coupled to the first NIC, the second port being coupled to a second network switch.

32. The method according to claim 31, further comprising:
receiving the particular flow from the first network switch;
determining whether to send the particular flow to a local port of the second network switch, the local port being coupled to the second NIC.

33. The method according to claim 30, wherein the hash is one of a plurality of hashes and is selected as a function of, at least in part, flow type of the particular flow.

34. The method according to claim 30, wherein the load balancing is performed on a per flow basis.

35. The method according to claim 30, wherein the load balancing is performed based, at least in part, on a particular flow type.

36. The method according to claim 35, wherein the load balancing is performed on a per flow basis within the particular flow type.

37. The method according to claim 30, further comprising:
forming a NIC team using the first NIC and the second NIC.

38. The method according to claim 30, wherein the first network switch uses a trunking algorithm.

* * * * *